(12) United States Patent
Kanzaki

(10) Patent No.: US 12,221,890 B2
(45) Date of Patent: Feb. 11, 2025

(54) TURBINE AND TURBOCHARGER

(71) Applicant: IHI Corporation, Tokyo (JP)

(72) Inventor: Dai Kanzaki, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/419,938

(22) Filed: Jan. 23, 2024

(65) Prior Publication Data

US 2024/0200456 A1 Jun. 20, 2024

Related U.S. Application Data

(63) Continuation of application No. PCT/JP2022/040920, filed on Nov. 1, 2022.

(30) Foreign Application Priority Data

Nov. 9, 2021 (JP) ................................ 2021-182419

(51) Int. Cl.
*F01D 1/02* (2006.01)
*F01D 9/02* (2006.01)
*F01D 25/24* (2006.01)

(52) U.S. Cl.
CPC ............. *F01D 1/023* (2013.01); *F01D 9/026* (2013.01); *F01D 25/24* (2013.01);
(Continued)

(58) Field of Classification Search
CPC ....... F01D 9/026; F01D 25/24; F05D 2240/12
See application file for complete search history.

(56) References Cited

U.S. PATENT DOCUMENTS 9,896,992 B2 * 2/2018 Smiljanovski .......... F01D 9/026
2014/0294577 A1 * 10/2014 Yoshida ................ F04D 29/403
415/204
2021/0102471 A1 4/2021 Kanzaki

FOREIGN PATENT DOCUMENTS

JP 55-132329 U 9/1980
JP H01-066433 U 4/1989
(Continued)

OTHER PUBLICATIONS

Translation of JP2020133587 (Year: 2024).*
International Search Report issued Jan. 24, 2023 in PCT/JP2022/040920 filed on Nov. 1, 2022, 2 pages.

*Primary Examiner* — Woody A Lee, Jr.
*Assistant Examiner* — Cameron A Corday
(74) *Attorney, Agent, or Firm* — Oblon, McClelland, Maier & Neustadt, L.L.P.

(57) ABSTRACT

Provided is a turbine including: a shaft; a turbine wheel mounted on one side of the shaft; an accommodating portion configured to accommodate the turbine wheel; a first turbine scroll flow passage that extends around the turbine wheel on a radially outer side, and communicates with the accommodating portion; a second turbine scroll flow passage that extends around the turbine wheel on the radially outer side, communicates with the accommodating portion, and is arranged on the one side with respect to the first turbine scroll flow passage; a first tongue portion that is provided at a position facing a downstream end of the first turbine scroll flow passage, and is inclined to one side of the turbine wheel in a circumferential direction as extending toward the one side; and a second tongue portion that is provided at a position facing a downstream end of the second turbine scroll flow passage, and is inclined to another side of the turbine wheel in the circumferential direction as extending toward the one side.

12 Claims, 6 Drawing Sheets

(52) U.S. Cl.
CPC ...... *F05D 2210/12* (2013.01); *F05D 2220/40* (2013.01); *F05D 2240/12* (2013.01); *F05D 2240/30* (2013.01)

(56) References Cited

FOREIGN PATENT DOCUMENTS

| | | | |
|---|---|---|---|
| JP | 2006-348894 A | | 12/2006 |
| JP | 2014-1656 A | | 1/2014 |
| JP | 2020133587 A | * | 8/2020 |
| WO | WO 2013/105316 A1 | | 7/2013 |
| WO | WO 2015/092373 A1 | | 6/2015 |
| WO | WO 2020/003649 A1 | | 1/2020 |

\* cited by examiner

TURBINE AND TURBOCHARGER

CROSS REFERENCE TO RELATED APPLICATIONS

This application is a continuation application of International Application No. PCT/JP2022/040920, filed on Nov. 1, 2022, which claims priority to Japanese Patent Application No. 2021-182419, filed on Nov. 9, 2021, the entire contents of which are incorporated by reference herein.

BACKGROUND ART

Technical Field

The present disclosure relates to a turbine and a turbocharger. This application claims the benefit of priority to Japanese Patent Application No. 2021-182419 filed on Nov. 9, 2021, and contents thereof are incorporated herein.

Related Art

For example, as disclosed in Patent Literature 1, as a turbine provided in a turbocharger or the like, there is a turbine in which two turbine scroll flow passages extending around a turbine wheel on a radially outer side are arranged side by side in an axial direction of the turbine wheel. A tongue portion is provided at a position facing a downstream end of each of the turbine scroll flow passages. The turbine as described above is also called a twin scroll type turbine.

CITATION LIST

Patent Literature

Patent Literature 1: JP 2006-348894 A

SUMMARY

Technical Problem

In a turbine having a tongue portion as in the twin scroll type turbine, when a blade body of the turbine wheel passes through the vicinity of the tongue portion, a flow passage area formed by the blade body and the tongue portion is instantaneously narrowed, thereby causing flow contraction of gas. As a result, a force applied to the blade body significantly fluctuates to cause blade vibration. It is desired that such blade vibration of the turbine wheel be reduced.

The present disclosure has an object to provide a turbine capable of reducing blade vibration of a turbine wheel, and a turbocharger.

Solution to Problem

In order to solve the above-mentioned problem, according to the present disclosure, there is provided a turbine, including: a shaft; a turbine wheel mounted on one side of the shaft; an accommodating portion configured to accommodate the turbine wheel; a first turbine scroll flow passage that extends around the turbine wheel on a radially outer side, and communicates with the accommodating portion; a second turbine scroll flow passage that extends around the turbine wheel on the radially outer side, communicates with the accommodating portion, and is arranged on the one side with respect to the first turbine scroll flow passage; a first tongue portion that is provided at a position facing a downstream end of the first turbine scroll flow passage, and is inclined to one side of the turbine wheel in a circumferential direction as extending toward the one side; and a second tongue portion that is provided at a position facing a downstream end of the second turbine scroll flow passage, and is inclined to another side of the turbine wheel in the circumferential direction as extending toward the one side.

The first tongue portion may be inclined to a rotation direction of the turbine wheel as extending toward the one side, and the second tongue portion may be inclined to a direction opposite to the rotation direction as extending toward the one side.

The first tongue portion may be inclined to a direction opposite to a rotation direction of the turbine wheel as extending toward the one side, and the second tongue portion may be inclined to the rotation direction as extending toward the one side.

An inclination angle of each of the first tongue portion and the second tongue portion with respect to an axial direction of the turbine wheel when viewed in a radial direction of the turbine wheel may be equal to or less than an angle obtained by dividing 360° by the number of blade bodies of the turbine wheel.

In order to solve the above-mentioned problem, according to the present disclosure, there is provided a turbocharger including the above-mentioned turbine.

Effects of Disclosure

According to the present disclosure, it is possible to reduce blade vibration of the turbine wheel.

DESCRIPTION OF EMBODIMENTS

Figure 1:
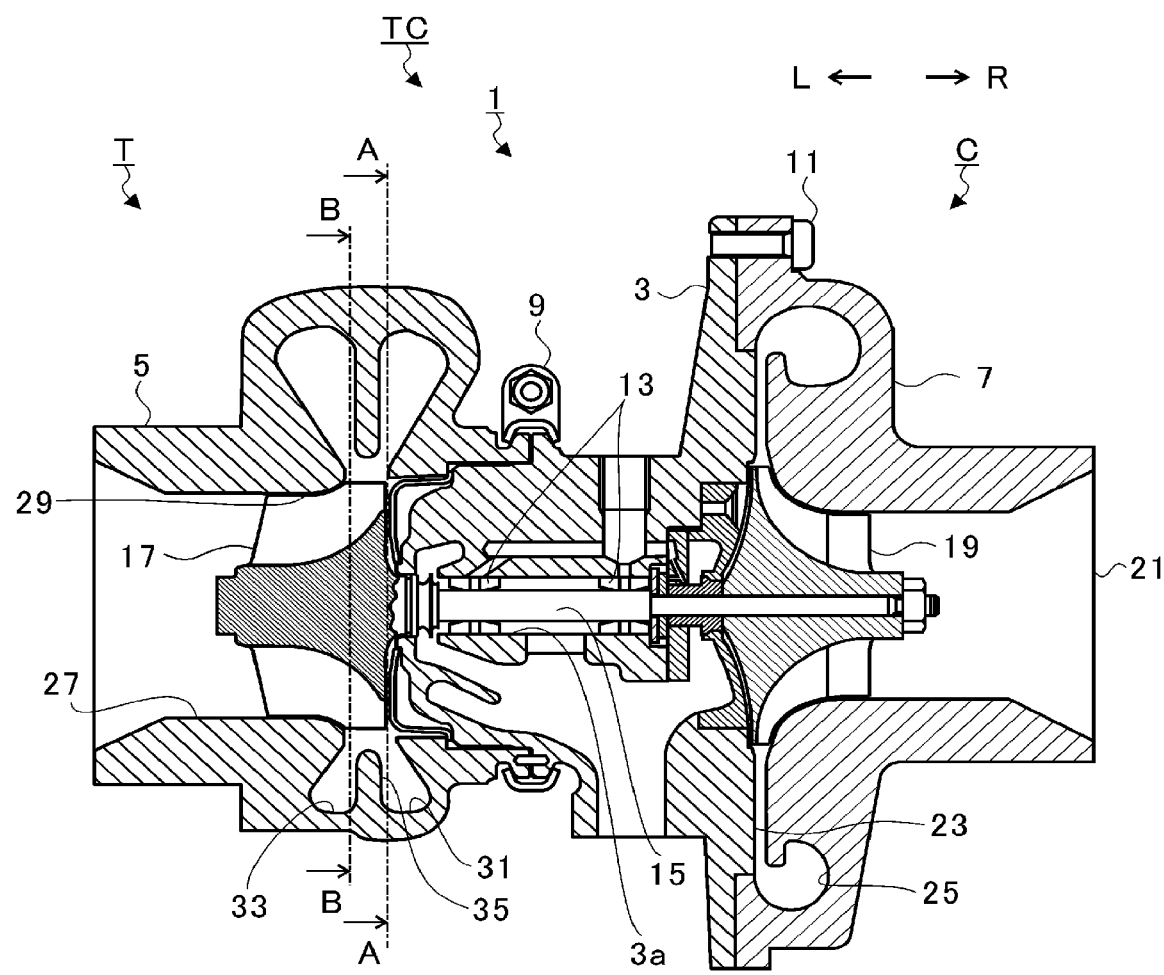
FIG. 1 is a schematic sectional view for illustrating a turbocharger according to an embodiment of the present disclosure.

Now, with reference to the attached drawings, an embodiment of the present disclosure is described. The dimensions, materials, and other specific numerical values represented in the embodiment are merely examples used for facilitating the understanding of the disclosure, and do not limit the present disclosure unless otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view for illustrating a turbocharger TC according to an embodiment of the present disclosure. In the following, description is given while a direction indicated by the arrow L illustrated in FIG. 1 corresponds to a left side of the turbocharger TC. A direction indicated by the arrow R illustrated in FIG. 1 corresponds to a right side of the turbocharger TC. As illustrated in FIG. 1, the turbocharger TC includes a turbocharger main body 1. The turbocharger main body 1 includes a bearing housing 3, a turbine housing 5, and a compressor housing 7.

The turbine housing 5 is coupled to a left side of the bearing housing 3 by a fastening mechanism 9. The fastening mechanism 9 is, for example, a G coupling. The compressor housing 7 is coupled to a right side of the bearing housing 3 by a fastening bolt 11. The turbocharger TC includes a turbine T and a centrifugal compressor C. The turbine T includes the bearing housing 3 and the turbine housing 5. The turbine T is a twin scroll type turbine. The centrifugal compressor C includes the bearing housing 3 and the compressor housing 7.

The bearing housing 3 has a bearing hole 3a formed therein. The bearing hole 3a passes through the bearing housing 3 in a right-and-left direction of the turbocharger TC. Bearings 13 are provided in the bearing hole 3a. In FIG. 1, a full floating bearing is illustrated as an example of the bearing 13. However, the bearing 13 may be other bearing such as a semi-floating bearing or a rolling bearing. The bearings 13 axially support a shaft 15 in a rotatable manner. A turbine wheel 17 is provided at a left end portion of the shaft 15. As described above, the turbine wheel 17 is mounted on a left side, which is one side of the shaft 15. The turbine wheel 17 is accommodated in the turbine housing 5 so as to be rotatable. A compressor impeller 19 is provided at a right end portion of the shaft 15. The compressor impeller 19 is accommodated in the compressor housing 7 so as to be rotatable.

An axial direction, a radial direction, and a circumferential direction of the turbocharger TC are hereinafter also simply referred to as "axial direction," "radial direction," and "circumferential direction," respectively. The axial direction of the turbocharger TC corresponds to an axial direction of the shaft 15, an axial direction of the turbine wheel 17, and an axial direction of the compressor impeller 19. The radial direction of the turbocharger TC corresponds to a radial direction of the shaft 15, a radial direction of the turbine wheel 17, and a radial direction of the compressor impeller 19. The circumferential direction of the turbocharger TC corresponds to a circumferential direction of the shaft 15, a circumferential direction of the turbine wheel 17, and a circumferential direction of the compressor impeller 19.

An intake port 21 is formed in the compressor housing 7. The intake port 21 is opened on the right side of the turbocharger TC. The intake port 21 is connected to an air cleaner (not shown). A diffuser flow passage 23 is defined by opposed surfaces of the bearing housing 3 and the compressor housing 7. The diffuser flow passage 23 increases pressure of air. The diffuser flow passage 23 has an annular shape. The diffuser flow passage 23 communicates with the intake port 21 on a radially inner side through intermediation of the compressor impeller 19.

Further, a compressor scroll flow passage 25 is formed in the compressor housing 7. The compressor scroll flow passage 25 has an annular shape. The compressor scroll flow passage 25 is located, for example, on a radially outer side with respect to the diffuser flow passage 23. The compressor scroll flow passage 25 communicates with an intake port of an engine (not shown) and the diffuser flow passage 23. When the compressor impeller 19 rotates, the air is sucked from the intake port 21 into the compressor housing 7. The sucked air is pressurized and accelerated in the course of flowing through blades of the compressor impeller 19. The air having been pressurized and accelerated is increased in pressure in the diffuser flow passage 23 and the compressor scroll flow passage 25. The air having been increased in pressure is guided to the intake port of the engine.

A discharge flow passage 27, an accommodating portion 29, a first turbine scroll flow passage 31, and a second turbine scroll flow passage 33 are formed in the turbine housing 5. The discharge flow passage 27 is opened on the left side of the turbocharger TC. The discharge flow passage 27 is connected to an exhaust-gas purification device (not shown). The discharge flow passage 27 communicates with the accommodating portion 29. The discharge flow passage 27 is continuous with the accommodating portion 29 in the axial direction. The accommodating portion 29 accommodates the turbine wheel 17. The first turbine scroll flow passage 31 and the second turbine scroll flow passage 33 are provided on a radially outer side with respect to the accommodating portion 29.

The first turbine scroll flow passage 31 and the second turbine scroll flow passage 33 extend around the turbine wheel 17 on a radially outer side. The first turbine scroll flow passage 31 and the second turbine scroll flow passage 33 communicate with the accommodating portion 29. The second turbine scroll flow passage 33 is arranged on a left side in the axial direction (that is, one side of the shaft 15 on which the turbine wheel 17 is mounted) with respect to the first turbine scroll flow passage 31. A partition plate 35 is formed between the first turbine scroll flow passage 31 and the second turbine scroll flow passage 33. The partition plate 35 partitions the first turbine scroll flow passage 31 and the second turbine scroll flow passage 33 in the axial direction. The first turbine scroll flow passage 31 and the second turbine scroll flow passage 33 communicate with an exhaust manifold of the engine (not shown). Exhaust gas exhausted from the exhaust manifold of the engine (not shown) is guided to the discharge flow passage 27 after the exhaust gas is sent to the accommodating portion 29 through the first turbine scroll flow passage 31 and the second turbine scroll flow passage 33. The exhaust gas guided to the discharge flow passage 27 in the course of flowing causes the turbine wheel 17 to rotate.

A rotational force of the turbine wheel 17 is transmitted to the compressor impeller 19 through the shaft 15. When the compressor impeller 19 rotates, the pressure of the air is increased as described above. In such a manner, the air is guided to the intake port of the engine.

Figure 2:
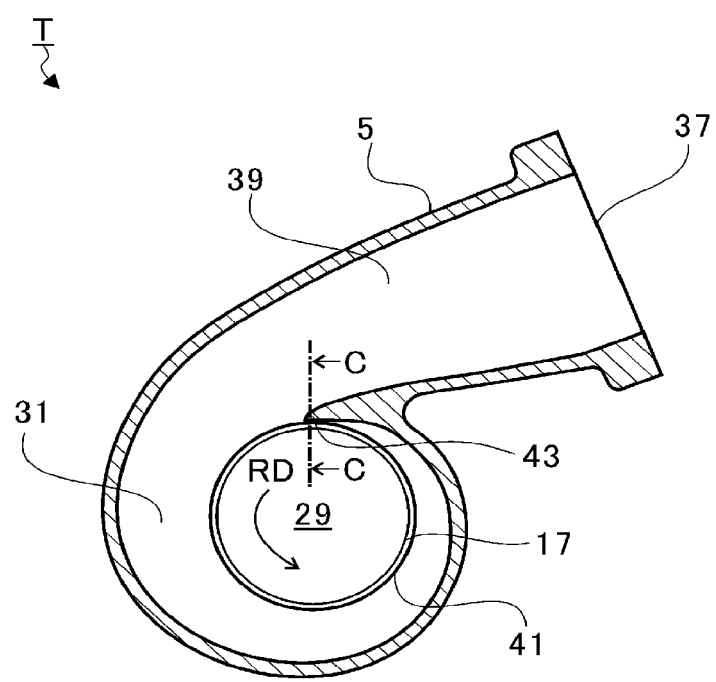
FIG. 2 is a sectional view taken along the line A-A in FIG. 1.

FIG. 2 is a sectional view taken along the line A-A in FIG. 1. The A-A cross section is a cross section that is orthogonal to the axial direction of the shaft 15 and passes through the first turbine scroll flow passage 31. In FIG. 2, the turbine wheel 17 is illustrated such that only an outer periphery thereof indicated by a circle is shown.

As illustrated in FIG. 2, a first exhaust-air introduction port 37 is formed in the turbine housing 5. The first exhaust-air introduction port 37 is open to the outside of the turbine housing 5. The exhaust gas exhausted from the exhaust manifold of the engine (not shown) is introduced into the first exhaust-air introduction port 37.

A first exhaust-air introduction passage 39 is formed between the first exhaust-air introduction port 37 and the first turbine scroll flow passage 31. The first exhaust-air introduction passage 39 connects the first exhaust-air introduction port 37 and the first turbine scroll flow passage 31 to each other. The first exhaust-air introduction passage 39 is formed, for example, into a straight shape. The first exhaust-air introduction passage 39 guides the exhaust gas introduced from the first exhaust-air introduction port 37, to the first turbine scroll flow passage 31.

The first turbine scroll flow passage 31 communicates with the accommodating portion 29 through a first communication portion 41. The first communication portion 41 is formed into an annular shape over the entire periphery of the accommodating portion 29. The first turbine scroll flow passage 31 guides the exhaust gas introduced from the first exhaust-air introduction passage 39, to the accommodating portion 29 through the first communication portion 41. The first turbine scroll flow passage 31 extends around the turbine wheel 17 so as to be closer to the turbine wheel 17 as extending in a rotation direction RD of the turbine wheel 17. A width of the first turbine scroll flow passage 31 in the radial direction decreases from an upstream side toward a downstream side.

A first tongue portion 43 is provided at a position facing a downstream end of the first turbine scroll flow passage 31. The first tongue portion 43 partitions a downstream portion and an upstream portion of the first turbine scroll flow passage 31.

Figure 3:
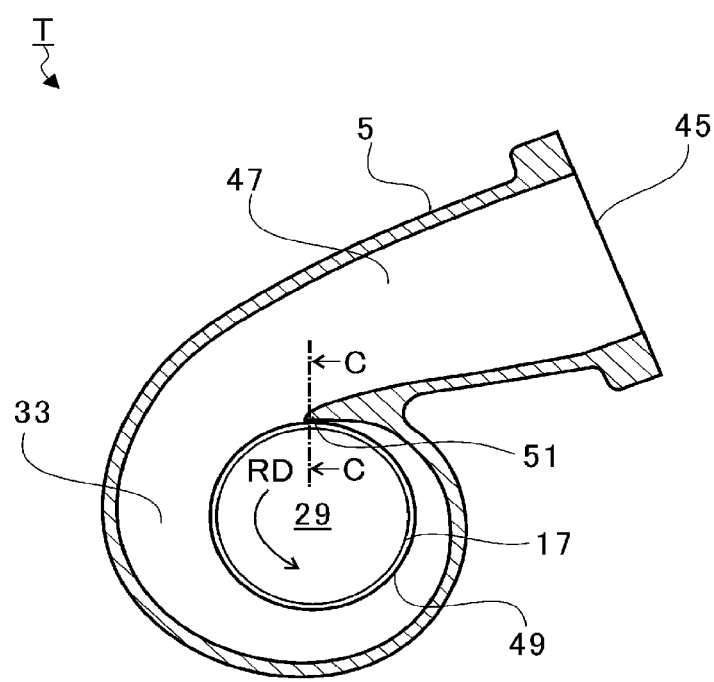
FIG. 3 is a sectional view taken along the line B-B in FIG. 1.

FIG. 3 is a sectional view taken along the line B-B in FIG. 1. The B-B cross section is a cross section that is orthogonal to the axial direction of the shaft 15 and passes through the second turbine scroll flow passage 33. In FIG. 3, similarly to FIG. 2, the turbine wheel 17 is illustrated such that only an outer periphery thereof indicated by a circle is shown.

As illustrated in FIG. 3, a second exhaust-air introduction port 45 is formed in the turbine housing 5. The second exhaust-air introduction port 45 is open to the outside of the turbine housing 5. The second exhaust-air introduction port 45 is arranged on the left side in the axial direction (that is, the one side of the shaft 15 on which the turbine wheel 17 is mounted) with respect to the first exhaust-air introduction port 37. The first exhaust-air introduction port 37 and the second exhaust-air introduction port 45 are partitioned by the partition plate 35 in the axial direction. The exhaust gas exhausted from the exhaust manifold of the engine (not shown) is introduced into the second exhaust-air introduction port 45.

A second exhaust-air introduction passage 47 is formed between the second exhaust-air introduction port 45 and the second turbine scroll flow passage 33. The second exhaust-air introduction passage 47 connects the second exhaust-air introduction port 45 and the second turbine scroll flow passage 33 to each other. The second exhaust-air introduction passage 47 is formed, for example, into a straight shape. The second exhaust-air introduction passage 47 is arranged on the left side in the axial direction (that is, the one side of the shaft 15 on which the turbine wheel 17 is mounted) with respect to the first exhaust-air introduction passage 39. The first exhaust-air introduction passage 39 and the second exhaust-air introduction passage 47 are partitioned by the partition plate 35 in the axial direction. The second exhaust-air introduction passage 47 guides the exhaust gas introduced from the second exhaust-air introduction port 45, to the second turbine scroll flow passage 33.

The second turbine scroll flow passage 33 communicates with the accommodating portion 29 through a second communication portion 49. The second communication portion 49 is formed into an annular shape over the entire periphery of the accommodating portion 29. The second communication portion 49 is arranged on the left side in the axial direction (that is, the one side of the shaft 15 on which the turbine wheel 17 is mounted) with respect to the first communication portion 41. The first communication portion 41 and the second communication portion 49 are partitioned by the partition plate 35 in the axial direction. The second turbine scroll flow passage 33 guides the exhaust gas introduced from the second exhaust-air introduction passage 47, to the accommodating portion 29 through the second communication portion 49. The second turbine scroll flow passage 33 extends around the turbine wheel 17 so as to be closer to the turbine wheel 17 as extending in the rotation direction RD of the turbine wheel 17. A width of the second turbine scroll flow passage 33 in the radial direction decreases from an upstream side toward a downstream side.

A second tongue portion 51 is provided at a position facing a downstream end of the second turbine scroll flow passage 33. The second tongue portion 51 partitions a downstream portion and an upstream portion of the second turbine scroll flow passage 33. A position of the first tongue portion 43 in the circumferential direction and a position of the second tongue portion 51 in the circumferential direction match each other.

Figure 4:
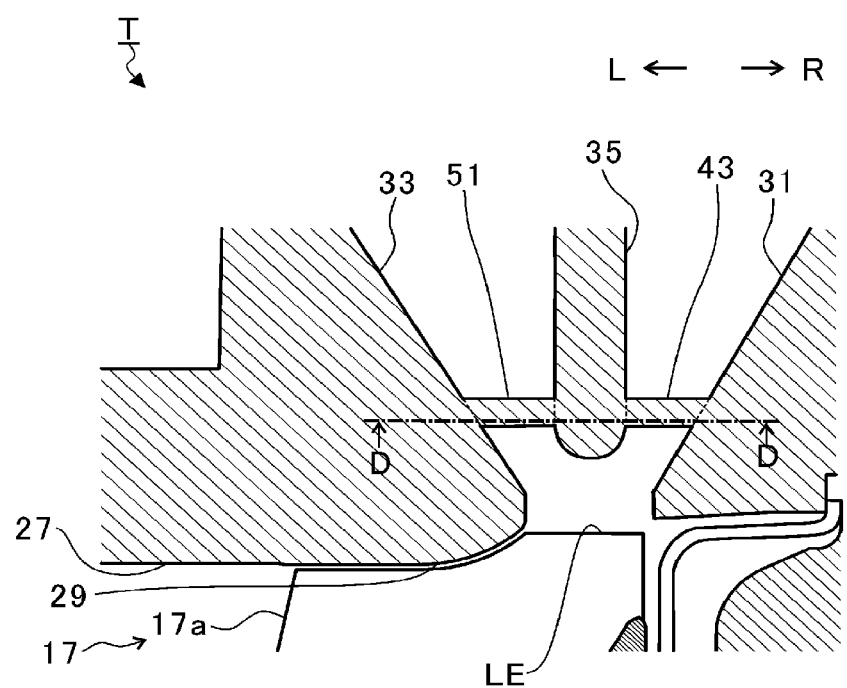
FIG. 4 is a sectional view taken along the line C-C in FIG. 2 and FIG. 3.

FIG. 4 is a sectional view taken along the line C-C in FIG. 2 and FIG. 3. The C-C cross section is a cross section that passes through the first tongue portion 43 and the second tongue portion 51 and includes a rotation axis of the turbine wheel 17.

As illustrated in FIG. 4, the turbine wheel 17 has a plurality of blade bodies 17a. The plurality of blade bodies 17a are provided at equal intervals in the circumferential direction. Each of the blade bodies 17a is formed so as to extend radially outward from an outer peripheral surface of a hub extending on the rotation axis of the turbine wheel 17. In an example of FIG. 4, a leading edge LE of the blade body 17a extends in parallel with the rotation axis of the turbine wheel 17. However, the leading edge LE may be inclined to the radially outer side as extending toward the left side in the axial direction (that is, the one side of the shaft 15 on which the turbine wheel 17 is mounted). The leading edge LE is a portion of an outer peripheral edge of the blade body 17a, which is opposed to the first turbine scroll flow passage 31 and the second turbine scroll flow passage 33. Exhaust gas flows into the accommodating portion 29 through the vicinity of the leading edge LE from the first turbine scroll flow passage 31 and the second turbine scroll flow passage 33.

The first tongue portion 43 and the second tongue portion 51 are arranged on a radially outer side with respect to the leading edge LE of the blade body 17a of the turbine wheel 17. In the example of FIG. 4, portions of the first tongue portion 43 and the second tongue portion 51 facing the turbine wheel 17 extend in parallel with the rotation axis of the turbine wheel 17. That is, the portions of the first tongue portion 43 and the second tongue portion 51 facing the turbine wheel 17 extend in parallel with the leading edge LE. When the first tongue portion 43 and the second tongue portion 51 are not particularly distinguished from each other, the first tongue portion 43 and the second tongue portion 51 are hereinafter simply referred to as "tongue portion."

In the turbine T, when the blade body 17a of the turbine wheel 17 passes through the vicinity of the tongue portion, a flow passage area formed by the blade body 17a and the tongue portion is instantaneously narrowed, thereby causing flow contraction of gas. As a result, a force applied to the blade body 17a significantly fluctuates to cause blade vibration. In this embodiment, in order to reduce the blade vibration of the turbine wheel 17, the shape of the tongue portion is devised.

Figure 5:
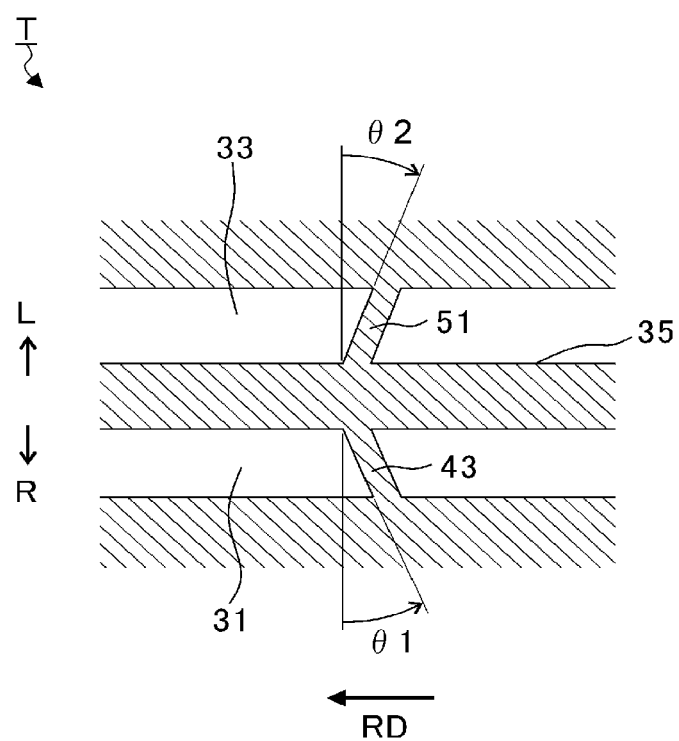
FIG. 5 is a sectional view taken along the line D-D in FIG. 4.

FIG. 5 is a sectional view taken along the line D-D in FIG. 4. The D-D cross section is a cross section that passes through the first tongue portion 43 and the second tongue portion 51 and is taken along the circumferential direction of the turbine wheel 17. The D-D cross section is a sectional view when the first tongue portion 43 and the second tongue portion 51 are viewed in the radial direction from the turbine wheel 17 side. In FIG. 5, the sectional view taken along the line D-D in FIG. 4 is illustrated, in which a direction indicated by the arrow L corresponds to an direction toward an upper side, and a direction indicated by the arrow R corresponds a direction toward a lower side.

In the turbine T, as illustrated in FIG. 5, the first tongue portion 43 is inclined to the rotation direction RD of the turbine wheel 17 as extending in the direction indicated by the arrow L. That is, the first tongue portion 43 is inclined to the rotation direction RD as extending toward the one side of the shaft 15 on which the turbine wheel 17 is mounted. The second tongue portion 51 is inclined to a direction opposite to the rotation direction RD of the turbine wheel 17 as extending in the direction indicated by the arrow L. That is, the second tongue portion 51 is inclined to the direction opposite to the rotation direction RD as extending toward the one side of the shaft 15 on which the turbine wheel 17 is mounted.

As described above, in the turbine T, the first tongue portion 43 is inclined to one side of the turbine wheel 17 in the circumferential direction as extending toward the one side of the shaft 15 on which the turbine wheel 17 is mounted. The second tongue portion 51 is inclined to another side of the turbine wheel 17 in the circumferential direction as extending toward the above-mentioned one side. Thus, when each of the tongue portions is viewed in the radial direction from the turbine wheel 17 side, each of the tongue portions is inclined to the circumferential direction with respect to the axial direction of the turbine wheel 17. Accordingly, regarding each of the tongue portions, when the blade bodies 17a of the turbine wheel 17 pass through the vicinity of the tongue portion, a part of the tongue portion is sequentially opposed to the blade bodies 17a.

As for the first tongue portion 43, first, a portion of the first tongue portion 43 on a side of the direction indicated by the arrow R is opposed to the blade body 17a. After that, the portion of the first tongue portion 43 opposed to the blade body 17a transitions to a side of the direction indicated by the arrow L. As for the second tongue portion 51, first, a portion of the second tongue portion 51 on a side of the direction indicated by the arrow L is opposed to the blade body 17a. After that, the portion of the second tongue portion 51 opposed to the blade body 17a transitions to a side of the direction indicated by the arrow R. Thus, regarding each of the tongue portions, the blade body 17a of the turbine wheel 17 is prevented from simultaneously being opposed to an entire region of the tongue portion. Accordingly, when the blade body 17a of the turbine wheel 17 passes through the vicinity of the tongue portion, a degree of instantaneous narrowing of the flow passage area formed by the blade body 17a and the tongue portion is reduced, thereby preventing occurrence of the flow contraction of gas. Thus, the instantaneous fluctuation of the force applied to the blade body 17a is suppressed, thereby reducing the blade vibration.

Further, in the turbine T, when each of the tongue portions is viewed in the radial direction from the turbine wheel 17 side, a direction in which the first tongue portion 43 is inclined with respect to the axial direction of the turbine wheel 17 and a direction in which the second tongue portion 51 is inclined with respect to the axial direction of the turbine wheel 17 are opposite to each other. Accordingly, a flow of gas flowing into the accommodating portion 29 of the turbine wheel 17 from the vicinity of the first tongue portion 43 and a flow of gas flowing into the accommodating portion 29 of the turbine wheel 17 from the vicinity of the second tongue portion 51 are plane symmetric with respect to a center plane of the partition plate 35. The center plane of the partition plate 35 is a plane that passes through a center of the partition plate 35 in a thickness direction thereof and is orthogonal to the axial direction. Accordingly, an axial-direction component of the flow of gas flowing into the accommodating portion 29 of the turbine wheel 17 from the vicinity of the first tongue portion 43 and an axial-direction component of the flow of gas flowing into the accommodating portion 29 of the turbine wheel 17 from the vicinity of the second tongue portion 51 cancel out each other. Thus, occurrence of vortex flow in the vicinity of the blade body 17a is prevented, and the instantaneous fluctuation of the force applied to the blade body 17a is more effectively suppressed. As a result, the blade vibration is more effectively reduced.

The first tongue portion 43 and the second tongue portion 51 are not always required to be plane symmetric with respect to the center plane of the partition plate 35. Even when the first tongue portion 43 and the second tongue portion 51 are not plane symmetric with respect to the center plane of the partition plate 35, the axial-direction component of the flow of gas flowing into the accommodating portion 29 of the turbine wheel 17 from the vicinity of the first tongue portion 43 and the axial-direction component of the flow of gas flowing into the accommodating portion 29 of the turbine wheel 17 from the vicinity of the second tongue portion 51 at least partially cancel out each other. Thus, the blade vibration is reduced.

In particular, in the turbine T, the first tongue portion 43 is inclined to the rotation direction RD as extending toward the one side of the shaft 15 on which the turbine wheel 17 is mounted, and the second tongue portion 51 is inclined to the direction opposite to the rotation direction RD as extending toward the above-mentioned one side. Accordingly, regarding the axial direction, the gas flowing into the accommodating portion 29 of the turbine wheel 17 from the vicinity of the first tongue portion 43 is guided to the left side in the axial direction by the first tongue portion 43. Meanwhile, regarding the axial direction, the gas flowing into the accommodating portion 29 of the turbine wheel 17 from the vicinity of the second tongue portion 51 is guided to a side opposite to the left side in the axial direction by the second tongue portion 51. Thus, the gas flowing into the accommodating portion 29 of the turbine wheel 17 from the vicinity of each of the tongue portions flows into a center side of the blade body 17a in the axial direction. As a result, aerodynamic performance is improved.

Description is given of inclination angles of the first tongue portion 43 and the second tongue portion 51 with respect to the axial direction when viewed in the radial direction of the turbine wheel 17. In FIG. 5, there are illustrated an inclination angle θ1 of the first tongue portion 43 with respect to the axial direction when viewed in the radial direction of the turbine wheel 17 and an inclination angle θ2 of the second tongue portion 51 with respect to the axial direction when viewed in the radial direction of the turbine wheel 17.

The inclination angle θ1 and the inclination angle θ2 substantially match each other. As the inclination angles θ1 and θ2 are larger, when the blade body 17a of the turbine wheel 17 passes through the vicinity of the tongue portion, the degree of instantaneous narrowing of the flow passage area formed by the blade body 17a and the tongue portion is more effectively reduced, thereby preventing occurrence of the flow contraction of gas more effectively. Thus, the instantaneous fluctuation of the force applied to the blade body 17a is more effectively suppressed, and the effect of reducing the blade vibration is improved. Meanwhile, when the inclination angles θ1 and θ2 are excessively large, flow field in the accommodating portion 29 of the turbine wheel 17 significantly deviates from an expected state. Thus, there is a fear in that the aerodynamic performance is degraded.

In view of suppressing the degradation of the aerodynamic performance, for example, it is preferred that each of the inclination angles θ1 and θ2 be equal to or less than an angle obtained by dividing 360° by the number of the blade bodies 17a of the turbine wheel 17. As the number of the blade bodies 17a is larger, time lag between timings at which the blade bodies 17a adjacent to each other are opposed to the tongue portion becomes shorter. With the inclination angles θ1 and θ2 set as described above, the inclination angles θ1 and θ2 can be made smaller as the number of the blade bodies 17a is larger. Accordingly, time required for each of the blade bodies 17a to pass through the tongue portion is prevented from relatively excessively becoming longer with respect to the above-mentioned time lag. Thus, the flow field in the accommodating portion 29 of the turbine wheel 17 is prevented from significantly deviating from the expected state, thereby suppressing the degradation of the aerodynamic performance.

However, each of the inclination angles θ1 and θ2 is not required to be equal to or less than an angle obtained by dividing 360° by the number of the blade bodies 17a of the turbine wheel 17. Further, the inclination angle θ1 and the inclination angle θ2 may be different from each other.

In the above, there has been described an example in which the each of the tongue portions is not inclined to the radial direction with respect to the axial direction of the turbine wheel 17 when viewed in the circumferential direction of the turbine wheel 17. However, at least one of the first tongue portion 43 or the second tongue portion 51 may be inclined to the radial direction with respect to the axial direction of the turbine wheel 17 when viewed in the circumferential direction of the turbine wheel 17.

Figure 6:
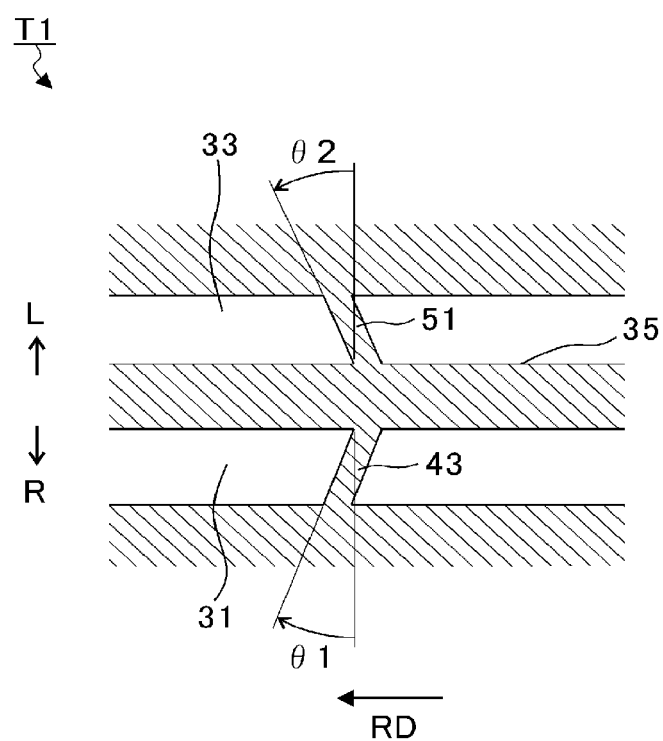
FIG. 6 is a sectional view taken along the line D-D in a turbine according to a modification example.

FIG. 6 is a sectional view taken along the line D-D in a turbine T1 according to a modification example. In the turbine T1, as compared to the turbine T described above, inclination directions of the first tongue portion 43 and the second tongue portion 51 are different from those given in the turbine T.

In the turbine T1, as illustrated in FIG. 6, the first tongue portion 43 is inclined to a direction opposite to the rotation direction RD of the turbine wheel 17 as extending in the direction indicated by the arrow L. That is, the first tongue portion 43 is inclined to the direction opposite to the rotation direction RD as extending toward the one side of the shaft 15 on which the turbine wheel 17 is mounted. The second tongue portion 51 is inclined to the rotation direction RD of the turbine wheel 17 as extending in the direction indicated by the arrow L. That is, the second tongue portion 51 is inclined to the rotation direction RD as extending toward the one side of the shaft 15 on which the turbine wheel 17 is mounted.

As described above, in the turbine T1, similarly to the turbine T described above, the first tongue portion 43 is inclined to the one side of the turbine wheel 17 in the circumferential direction as extending toward the one side of the shaft 15 on which the turbine wheel 17 is mounted. The second tongue portion 51 is inclined to the another side of the turbine wheel 17 in the circumferential direction as extending toward the above-mentioned one side. Thus, similarly to the above-mentioned turbine T, the effect of reducing the blade vibration is achieved.

In particular, in the turbine T1, the first tongue portion 43 is inclined to the direction opposite to the rotation direction RD as extending toward the one side of the shaft 15 on which the turbine wheel 17 is mounted. The second tongue portion 51 is inclined to the rotation direction RD as extending toward the above-mentioned one side. Accordingly, in portions of the first turbine scroll flow passage 31 and the second turbine scroll flow passage 33 adjacent to the tongue portions on an upstream side (portions on a left side with respect to the first tongue portion 43 and the second tongue portion 51 in FIG. 6), an angle formed by each of the tongue portions and a surface opposed to the partition plate 35 among inner surfaces of each of the turbine scroll flow passages becomes an obtuse angle. Thus, on the upstream side of each of the turbine scroll flow passages that is close to an engine exhaust air and is to be in contact with gas having more energy, a crack is prevented from occurring in a boundary portion between each of the tongue portions and each of the turbine scroll flow passages.

Also in the turbine T1, similarly to the turbine T1, each of the inclination angles θ1 and θ2 may be equal to or less than an angle obtained by dividing 360° by the number of the blade bodies 17a of the turbine wheel 17, or may not be equal to or less than the above-mentioned angle. Further, the inclination angles θ1 and θ2 may substantially match each other or may be different from each other. In addition, each of the tongue portions is not required to be inclined to the radial direction with respect to the axial direction of the turbine wheel 17 when viewed in the circumferential direction of the turbine wheel 17. At least one of the first tongue portion 43 or the second tongue portion 51 may be inclined to the radial direction with respect to the axial direction of the turbine wheel 17.

An embodiment of the present disclosure has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

In the above, the example in which the turbine T is mounted to the turbocharger TC has been described. However, the turbine T may be mounted to devices other than the turbocharger TC, such as a power generator.

The present disclosure can reduce the blade vibration of the turbine wheel. Thus, for example, the present disclosure can contribute to Goal 7 "Ensure access to affordable, reliable, sustainable and modern energy for all" and Goal 9 "Build resilient infrastructure, promote inclusive and sustainable industrialization and foster innovation" of the Sustainable Development Goals (SDGs).

The invention claimed is:
1. A turbine, comprising:
a shaft;
a turbine wheel mounted on one side of the shaft;
an accommodating portion configured to accommodate the turbine wheel;
a first turbine scroll flow passage that extends around the turbine wheel on a radially outer side, and communicates with the accommodating portion;
a second turbine scroll flow passage that extends around the turbine wheel on the radially outer side, communicates with the accommodating portion, and is arranged on the one side with respect to the first turbine scroll flow passage;

a first tongue portion that is provided at a position facing a downstream end of the first turbine scroll flow passage, and is inclined to one side of the turbine wheel in a circumferential direction as extending toward the one side; and a second tongue portion that is provided at a position facing a downstream end of the second turbine scroll flow passage, and is inclined to another side of the turbine wheel in the circumferential direction as extending toward the one side, wherein the first tongue portion and the second tongue portion extend in a straight line when viewed in a radial direction of the turbine wheel.

2. The turbine according to claim 1, wherein the first tongue portion is inclined to a rotation direction of the turbine wheel as extending toward the one side, and wherein the second tongue portion is inclined to a direction opposite to the rotation direction as extending toward the one side.

3. The turbine according to claim 1, wherein the first tongue portion is inclined to a direction opposite to a rotation direction of the turbine wheel as extending toward the one side, and wherein the second tongue portion is inclined to the rotation direction as extending toward the one side.

4. The turbine according to claim 1, wherein an inclination angle of each of the first tongue portion and the second tongue portion with respect to an axial direction of the turbine wheel when viewed in a radial direction of the turbine wheel is equal to or less than an angle obtained by dividing 360° by a number of blade bodies of the turbine wheel.

5. The turbine according to claim 2, wherein an inclination angle of each of the first tongue portion and the second tongue portion with respect to an axial direction of the turbine wheel when viewed in a radial direction of the turbine wheel is equal to or less than an angle obtained by dividing 360° by a number of blade bodies of the turbine wheel.

6. The turbine according to claim 3, wherein an inclination angle of each of the first tongue portion and the second tongue portion with respect to an axial direction of the turbine wheel when viewed in a radial direction of the turbine wheel is equal to or less than an angle obtained by dividing 360° by a number of blade bodies of the turbine wheel.

7. A turbocharger, comprising the turbine of claim 1.
8. A turbocharger, comprising the turbine of claim 2.
9. A turbocharger, comprising the turbine of claim 3.
10. A turbocharger, comprising the turbine of claim 4.
11. A turbocharger, comprising the turbine of claim 5.
12. A turbocharger, comprising the turbine of claim 6.

* * * * *